United States Patent
Spinelli et al.

(10) Patent No.: US 10,145,699 B2
(45) Date of Patent: Dec. 4, 2018

(54) SYSTEM AND METHODS FOR REAL-TIME ESCAPE ROUTE PLANNING FOR FIRE FIGHTING AND NATURAL DISASTERS

(71) Applicant: The Boeing Company, Chicago, IL (US)

(72) Inventors: Charles Briggs Spinelli, Anthem, AZ (US); Alan Eugene Bruce, Kent, WA (US); Daniel Dale Fuller, Stevenson, WA (US); Michael Vincent Sahag, Reston, VA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/839,838

(22) Filed: Aug. 28, 2015

(65) Prior Publication Data

US 2017/0059343 A1    Mar. 2, 2017

(51) Int. Cl.
*G01C 21/34* (2006.01)
*G01C 21/36* (2006.01)

(52) U.S. Cl.
CPC ..... *G01C 21/3461* (2013.01); *G01C 21/3667* (2013.01)

(58) Field of Classification Search
None
See application file for complete search history.

(56) References Cited

U.S. PATENT DOCUMENTS

| | | | |
|---|---|---|---|
| 7,210,537 B1 * | 5/2007 | McNeil | A62C 3/0278 |
| | | | 102/302 |
| 7,689,328 B2 | 3/2010 | Spinelli | |
| 8,798,922 B2 | 8/2014 | Tillotson et al. | |
| 2006/0241853 A1 * | 10/2006 | Gadler | G01C 21/26 |
| | | | 701/514 |
| 2008/0046134 A1 | 2/2008 | Bruce et al. | |

(Continued)

FOREIGN PATENT DOCUMENTS

| | | | | |
|---|---|---|---|---|
| CN | 102165500 A | * | 8/2011 | G08B 7/066 |
| DE | 102008042391 A1 | * | 4/2016 | |
| JP | 2017-004213 A | * | 6/2015 | |

OTHER PUBLICATIONS

Translation of Igarashi et al.*

(Continued)

*Primary Examiner* — Jean Paul Cass
(74) *Attorney, Agent, or Firm* — Kolisch Hartwell, P.C.

(57) ABSTRACT

A forest fire real-time escape route planning system may include a processor that receives real-time Geographical Information System data. The system may include a firefighter endurance and route-planning model for determining, based on data received by the processor, one or more firefighter evacuation routes to one or more safe areas. The model may determine a rating for each evacuation route based on a degree of risk. The model may predict a rate of fire progression based on fire fuel proximate the fire. They system may include a transmitting device for communicating the one or more firefighter evacuation routes along with the rating for each evacuation route to a mobile device. The mobile device may be configured to display the one or more firefighter evacuation routes overlaid on a map depicting a current location of a firefighter relative to the fire.

4 Claims, 9 Drawing Sheets

(56) References Cited

U.S. PATENT DOCUMENTS

| | | | | |
|---|---|---|---|---|
| 2011/0112660 A1* | 5/2011 | Bergmann | ............ | G08B 7/066 700/29 |
| 2012/0261144 A1 | 10/2012 | Vian et al. | | |
| 2013/0281861 A1* | 10/2013 | Flomerfelt | ............... | A61B 8/02 600/454 |
| 2015/0261769 A1* | 9/2015 | Ono | .................... | G06F 17/3087 707/724 |
| 2016/0112853 A1* | 4/2016 | Goossen | ................ | H04W 4/90 455/404.2 |
| 2017/0059343 A1* | 3/2017 | Spinelli | .............. | G01C 21/3461 |

OTHER PUBLICATIONS

Santee, et al., A Proposed Model for Load Carriage on Sloped Terrain; Aviation, Space and Environmental Medicine, vol. 72, No. 6, Jun. 2001, pp. 562-566.

Wood et al., Energetically Optimal Travel Across Terrain: Visualizations and a New Metric of Geographic Distance with Archaeological Applications; SPIE Proceedings: San Jose, CA, vol. 6060, Jan. 16, 2006, 7 pages.

* cited by examiner

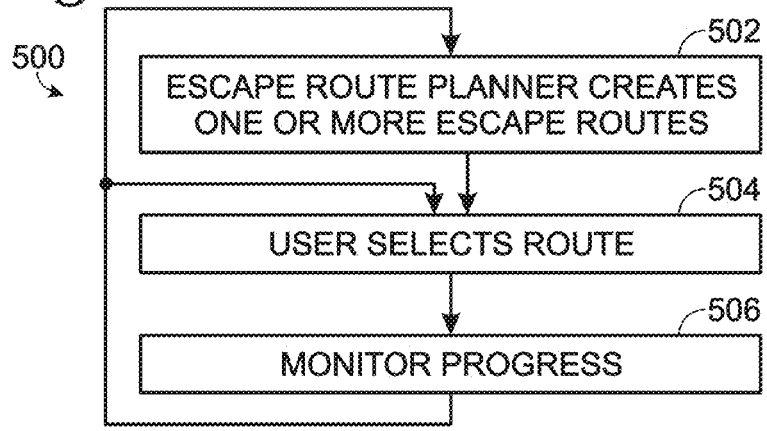
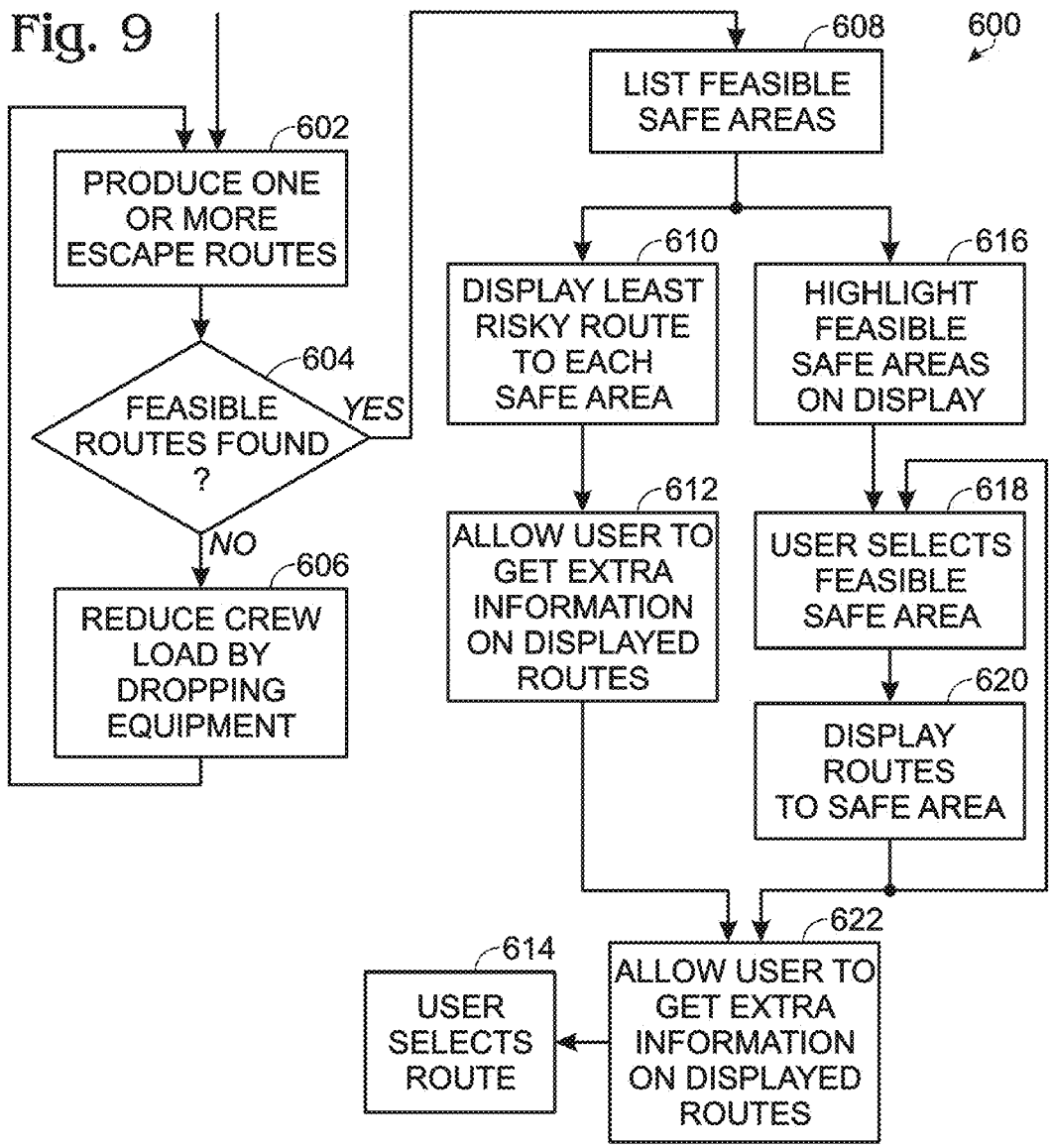

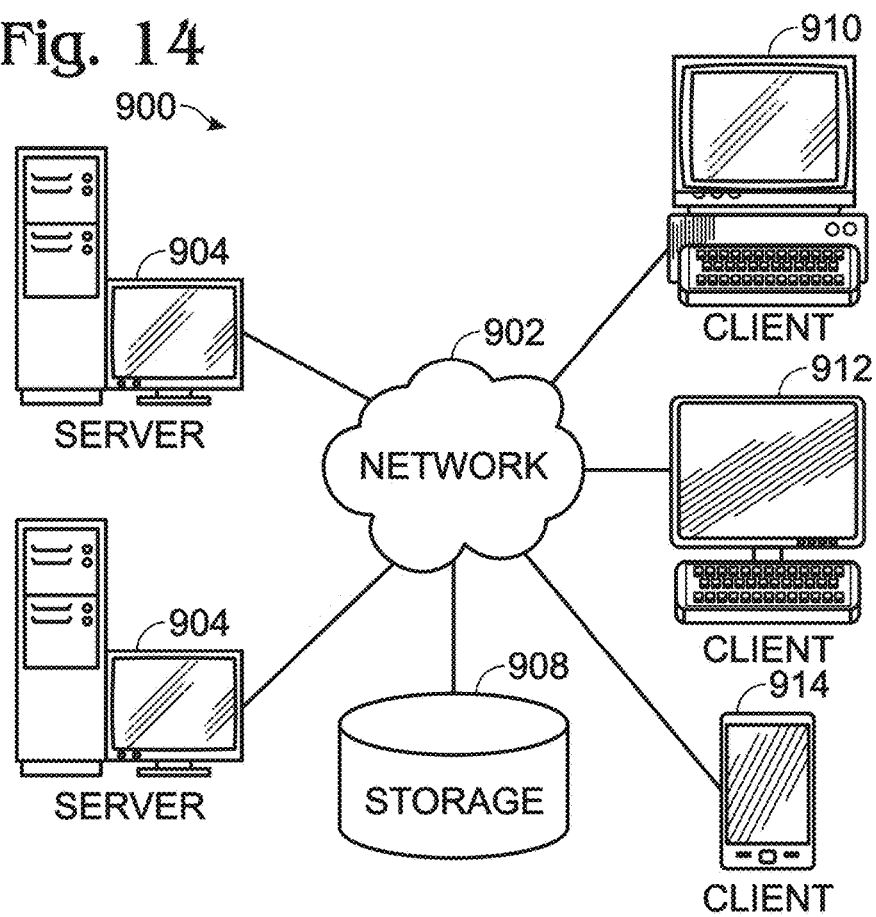

SYSTEM AND METHODS FOR REAL-TIME ESCAPE ROUTE PLANNING FOR FIRE FIGHTING AND NATURAL DISASTERS

FIELD

The present invention relates generally to escape route planning for wildland firefighting crews. More specifically, the disclosed embodiments relate to methods and systems for dynamically planning escape routes across terrain based on data related to the fire, the crew, and the geographical fire area. The disclosed embodiments further relate to methods and systems for communicating those escape routes to the firefighting crew.

BACKGROUND

Fighting fires is a dangerous occupation, particularly when the fire is located in rugged terrain. Many factors contribute to this danger: Firefighting crews may have to travel on foot across open country without the benefit of roads or trails. Crews may have to travel across steep, mountainous terrain. In steep mountainous terrain, crews may have limited access to reliable communication. Fire managers located in a safe control operations area may not know the exact location of a crew. The information regarding a fire's location, speed, and direction of travel may be hours out of date and no longer accurate. The crew may not be aware of available safe zones, even if those safe zones are relatively nearby. The crew may not be aware of changing weather patterns. Crews often rely on lookouts or observation towers for information regarding the fire, which themselves may be abandoned for safety reasons. If a crew decides it needs to evacuate to a safe area, they may not know the fastest or the safest route to that safe area and they may have to guess if they can make it to the safe area ahead of the fire.

For at least the above reasons firefighters may find themselves in situations that are considerably more dangerous than anticipated. Knowing the fastest and safest route to a safe area may mean the difference between a frightening experience and tragedy. In order to predict whether or not a crew can make it from their current location to a safe area ahead of a fire, the firefighters need to be able to predict three things with some degree of accuracy: how fast the fire will travel, the direction in which the fire will travel, and how fast the crew will travel.

SUMMARY

A forest fire real-time escape route planning system may include a processor that receives real-time Geographical Information System data. The system may include a firefighter endurance and route-planning model for determining, based on data received by the processor, one or more firefighter evacuation routes to one or more safe areas. The model may determine a rating for each evacuation route based on a degree of risk. The model may predict a rate of fire progression based on fire fuel proximate the fire. The system may include a transmitting device for communicating the one or more firefighter evacuation routes along with the rating for each evacuation route to a mobile device. The mobile device may be configured to display the one or more firefighter evacuation routes overlaid on a map depicting a current location of a firefighter relative to the fire.

Another forest fire real-time escape route planning system may include a processor that receives, into a database, real-time information pertaining to a geographical area, a fire located within the area, a firefighting crew located within the area, and weather in the area. The system may include an escape route planner including the database of information, a fire model configured to predict a rate of fire progression based on information in the database, and an escape route finder. The escape route finder may be configured to produce one or more firefighter escape routes, based on the fire model, to one or more safe areas and a safety rating for each escape route based on a degree of risk.

A method for facilitating the evacuation of a firefighting crew may include predicting a progression of a fire based on fire-related data. The method may include determining, based on the predicted progression of the fire, one or more evacuation routes from an initial location of the firefighting crew to one or more safe areas, such that the one or more evacuation routes to each safe area are unlikely to cross a fire line. The method may include selecting an evacuation route and displaying a map to a user, the map overlaid with the selected evacuation route and a current location of the firefighting crew.

The present disclosure provides various systems and associated methods. In some embodiments, a system may include an escape route planner configured to produce one or more escape routes for a firefighting crew and an associated degree of risk for each route. In some embodiments, a system may include a display from which a user may select an escape route from one or more escape routes. In some embodiments, a system may include a display on which a user may monitor the progress of a firefighting crew along an escape route. Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 8 is a flow chart illustrating a method of facilitating the evacuation of a firefighting crew.

FIG. 9 is a flow chart illustrating an exemplary method of selecting an evacuation route.

FIG. 14 is a schematic representation of an illustrative computer network system.

DESCRIPTION

Overview

Figure 1:
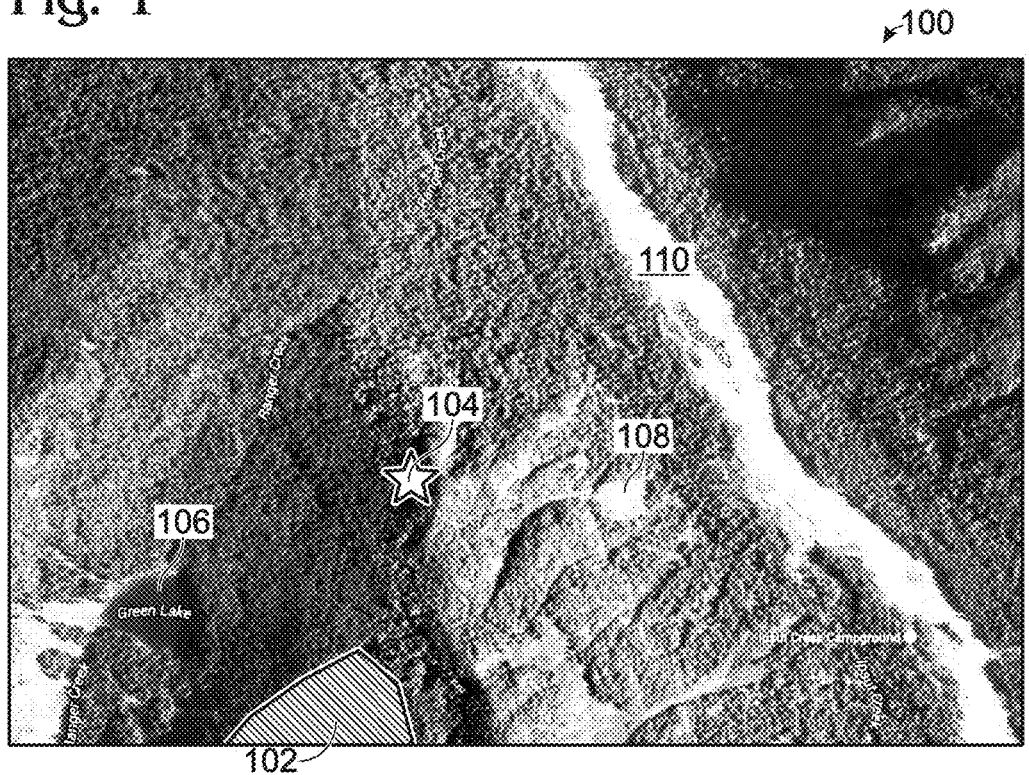
FIG. 1 is an aerial view of a geographical area including a fire and a location of a firefighting crew.

Various embodiments of an escape route planning system, including related methods, are described below and illustrated in the associated drawings. Unless otherwise specified, an escape route planning system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other evacuation route planning systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

An escape route planning system may include a data processing system that receives data related to a geographical area, a fire located within that geographical area, and a firefighting crew within that geographical area among others. This data may be used as inputs for a fire model that may predict or project the future progress of the fire. The data may be used as inputs for a crew model that may predict the rate of travel of the firefighting crew along one or more evacuation routes across the geographical area.

The escape route planning system may include a route finder that uses the data, the output of the fire model, and the output of the crew model to produce one or more escape routes. The route finder may use one or more route-finding algorithms executed by the data processing system.

Aspects of an escape route planning system may be embodied as a computer method, computer system, or computer program product. Accordingly, aspects of the escape route planning system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the escape route planning system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the escape route planning system may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the escape route planning system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the escape route planning system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Definitions

In the present disclosure, the term "real-time" describes processes that happen so fast as to appear nearly instantaneous to a human observer. Such processes may not actually be instantaneous due to the finite travel speed of communication signals or the small, but non-zero, time required to accomplish various computer processes.

The terms "modeling" or "model" refer to complex operations or simulations carried out by a computing system involving various kinds of input information and algorithms to produce output data.

EXAMPLES, COMPONENTS, AND ALTERNATIVES

The following describes selected aspects of exemplary escape route planning systems as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

This example describes a situation where a wildland firefighting crew may need to evacuate their current position due to the projected progress of a forest fire; see FIG. 1.

FIG. 1 is an aerial view of a geographical area or fire area, generally indicated at 100, including a forest fire 102 and a location 104 of a firefighting crew. A location of the fire 102 may be determined by a variety of sources, including direct human observation, remote sensing devices such as unmanned aerial vehicles or satellites, or any combination of these. The location 104 of the firefighting crew may be known by self-reporting of the crew via a communications channel such as a radio or phone, by monitoring one or more Global Positions System (GPS) unit(s) held by the crew, or any other appropriate means.

It may be the case that the location 104 of the firefighting crew is not safe, as determined by the location and projected progress of the fire 102. It may be possible that location 104 was once safe but a shift in weather patterns or wind has altered the path of the fire so that location 104 is no longer safe. If the decision is made to evacuate the crew to a safe zone or area, decisions must be made as to which safe area to travel to, if there is a choice, and which escape route to that safe area would be the fastest and/or the safest. In the example scenario depicted in FIG. 1, the crew may have a choice of safe areas, for example, a lake 106, a clearing in the forest 108, and a river bed 110.

Given the proximity of the lake 106 to the fire 102, it may be risky to attempt to travel to the lake. Clearing 108 may provide moderate safety, though the crew may have to travel uphill and across open forest to get there, a process that may be time consuming. River bed 110 may provide considerable safety given the lack of available fuel in the river bed, the source of water in the river itself, and an associated road that may provide evacuation vehicles to the crew. Travelling to river bed 110 may be relatively quick, as the route may be largely downhill and partially involve an established trail.

In this example scenario, the crew may not be aware of all the available safe areas, the best routes to each of them, and/or the relative risk of each of the routes. They may further be unaware of changing weather patterns or fire conditions that would necessitate an evacuation. One of the objectives of the escape route planning system and methods of the present disclosure is to provide some or all of this information to the firefighting crew or a fire managing crew in communication with the firefighting crew.

Example 2

Figure 2:
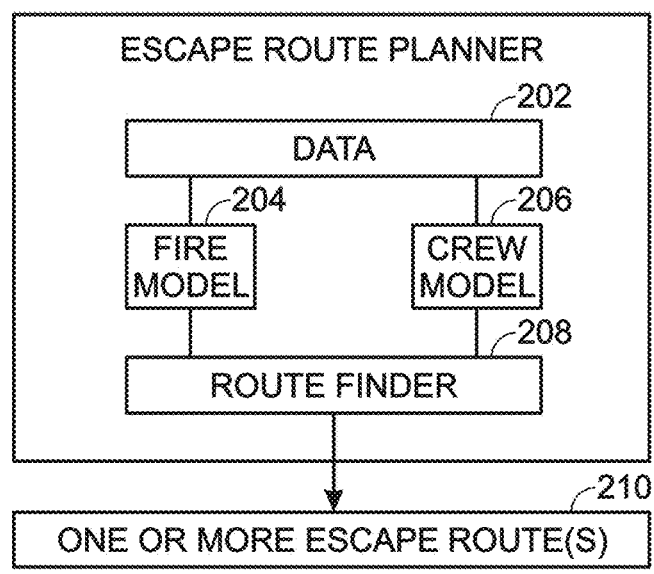
FIG. 2 is a schematic diagram of an escape route planner including a fire model and a crew model.
Figure 3:
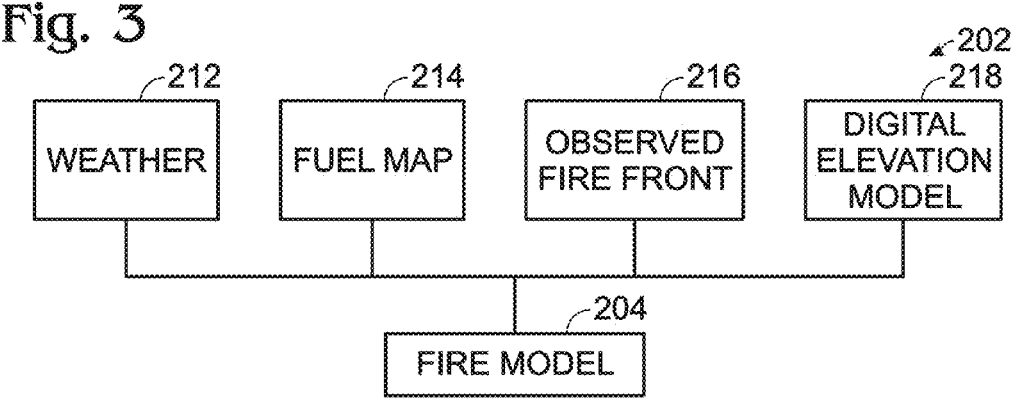
FIG. 3 is a schematic diagram of fire data and the fire model of FIG. 2.
Figure 4:
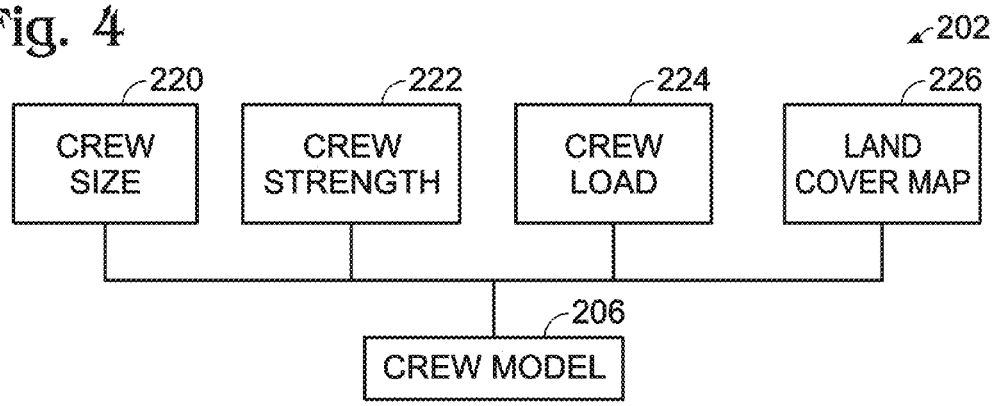
FIG. 4 is a schematic diagram of crew data and the crew model of FIG. 2.

This example describes an illustrative escape route planner configured to produce one or more escape routes, which may be used in conjunction with any of the systems, methods, or apparatuses described herein; see FIGS. 2-4.

FIG. 2 is a schematic diagram of an escape route planner, generally indicated at 200. Escape route planner 200 may include data 202, a fire model 204, a crew model 206, and a route finder 208. Escape route planner 200 may produce one or more escape routes 210.

Data 202 may include many different formats and types of data related to many different objects. For example, included in data 202 may be Geographical Information System (GIS) data pertaining to a fire area, data related to weather in a fire area, a fuel map of the fire area, an observed fire front of a fire in the fire area, a digital elevation model of the fire area, a location of a firefighting crew in the fire area, a size of the crew, a strength of the crew, a load carried by the crew, and a land-cover map, among others. Data 202 may include historical data and/or real-time data. Data 202 may include information gathered by remote or in-situ sensors. Examples of remote sensors include airborne sensors such as infrared or multi-spectral sensors housed on manned or unmanned aerial vehicles. In-situ sensors may be deployed by firefighters as they move through the fire area.

Fire model 204 may predict and/or project the future progress of the fire based, at least in part, on the data 202. The fire model is described in more detail in reference to FIG. 3. Crew model 204 may predict and/or project the travel speed of the firefighting crew along one or more escape routes based, at least in part, on the data 202. The crew model is described in more detail in reference to FIG. 4.

Route finder 208 may use data 202, fire model 204, and crew model 206 along with a route-finding algorithm to produce one or more escape routes 210. An exemplary route-finding algorithm using spatiotemporal spanning trees is described in more detail in Example 3 below and in reference to FIGS. 5 and 6. Another exemplary route-finding algorithm using a Pareto front optimization scheme is described in more detail in Example 4 below and in reference to FIG. 7. Route finder 208 may calculate a risk factor for each escape route in the one or more escape routes. The risk factor may be a numerical factor, for example, the maximum probability of the crew and the fire ever being located at the same place and the same time along the route or the accumulated probability along the route. The risk factor may be a descriptive word chosen from a list, for example, high, medium, or low risk.

The one or more escape routes 210 may include one escape route to each safe area or more than one escape route to each safe area. Each escape route in the one or more escape routes 210 may be associated with a risk factor. Some or all of the one or more escape routes 210 may be presented to a user so that a particular escape route may be chosen. More details of an exemplary choosing process are described in Example 5 and in reference to FIGS. 8-10.

Once a particular escape route has been chosen the progress of the crew along the chosen route may be monitored by the escape route planning system. If the conditions of the fire or the crew change sufficiently the escape route planner 200 may create another set of one or more escape routes from which a new escape route may be chosen. More details of an exemplary monitoring process are described in Example 5 and in reference to FIGS. 8-11.

FIG. 3 is a schematic diagram of fire model 204 and a subset of data 202. Included in data 202 may be weather data 212, a fuel map 214, an observed fire front 216, and a digital elevation model 218.

Weather data 212 may include several kinds of data from several different sources. For example, weather data may include data related to wind, humidity, temperature, air pressure, and precipitation. Weather data 212 may include current weather conditions, historical weather conditions, and forecasted information. All of these kinds of weather data, among others, may be used by the fire model 204 to predict the future progress of the fire.

Fuel map 214 may provide a mapping of a fuel level in the forest. The fire control practices of the mid-20th century have left excess fuel in many forests. This excess fuel may be in the form of dead wood in a dense understory. A dense understory may provide a ladder for the fire to reach the tall tree canopy. Periodic, low-intensity fires are now considered good for the health of forests as they can remove excess fuel. Conversely, if a forest hasn't had any fire in decades it may be considered unhealthy. Such unhealthy forests are prone to intense fires that pose more danger to firefighting crews.

Fuel map 214 may be created by historical data, remote sensing imagery, or a combination of these and other sources of information. For example, in the aerial photograph depicted in FIG. 1, a low-fuel area can be seen between forest fire 102 and river bed 110 where a previous fire removed much of the available fuel. If fire 102 reaches this low-fuel area it may slow down. Fuel map 214 may be used by the fire model 204 to predict the future progress of the fire.

Observed fire front 216 may be a current location or locations of a fire. The observed fire front may also be taken to be a leading edge or edges of a fire. The observed fire front may be determined by human reports or by remote sensing data. Remote sensing data may be acquired by manned or unmanned surveillance aircraft, satellites, or other means. Fire model 204 may use the observed fire front 216 as an initial condition for projecting the future progression of the fire.

Digital elevation model 218 may include information such as an elevation associated with a plurality of locations within the fire area. Alternately, the digital elevation model may include information in the form of a set of contour lines of elevation. The digital elevation model may be associated with GIS data. From any such information a slope of the terrain can be calculated, among other quantities. The slope of the terrain can have a dramatic effect of the progression of a fire, as fires move faster going uphill than downhill. Fire model 204 may use the digital elevation model 218 to predict the future progress of the fire.

Fire model 204 may use some or all of the above information or data, along with others, to produce a forecast of where the fire will be located at any given time in the future. Fire model 204 may predict the future location(s), travel direction(s), and travel speed(s) of the fire. Fire model 204 may predict the future location(s) of the fire front and/or the future locations of a back edge of the fire.

FIG. 4 is a schematic diagram of crew model 206 and a subset of data 202. Included in data 202 may be a crew size 220, a crew strength 222, a crew load 224, and a land cover map 226, among others.

Crew model 206 may predict a rate of travel of the firefighting crew, a measure of the endurance of the crew, and other quantities. Crew model 206 may predict the rate of travel of each individual member of the crew or the crew as a whole. The rate of travel of the crew may be limited by the rate of travel of the slowest member of the crew. The crew model may track the past energy usage, maximum exertion, travel rates, and other quantities of the crew, as individual members or as a whole. The crew model \may make these predictions in part based on data 202.

Crew size 220 may be a count of the number of individual members of the firefighting crew. Crew size 220 may include information about the height and/or weight of each individual member of the crew. The rate of travel of the crew may depend on the size of the crew. Crew model 206 may use the crew size 220 to predict the rate of travel of the firefighting crew.

Crew strength 222 may include multiple kinds of information from multiple different sources. Crew strength 222 may include a measure of the physical strength of each member of the crew. The crew strength may be determined by a variety of factors, including but not limited to, the physical size of each crew member, the age of each crew member, the sex of each crew member, and the activities recently performed by each crew member, among others. A firefighting crew may also have been subjected to prior tests designed to measure their physical strength and/or endurance, and the results of those tests may be included in crew strength 222. Crew model 206 may use the crew strength 222 to predict the rate of travel of the firefighting crew.

Crew load 224 may be information or data related to the equipment carried by the crew. Firefighting crews often travel with a great deal of equipment, for example: shovels, Pulaskis, driptorches, saws, axes, chainsaws, fuel, food, water, emergency shelters, and other personal gear, among many other possibilities. The travel speed of the crew may depend on how much gear and equipment each member of the crew is carrying. If escape route planner 200 does not find any suitable evacuation routes, the crew may need to drop some equipment in order to travel faster. Escape route planner 200 may then attempt to find suitable escape routes for the faster-travelling crew. Crew model 206 may use the crew load 224 to predict the rate of travel of the firefighting crew.

Land cover map 226 may include information or data from a geospatial database that tracks different types of land cover. For example, land cover map 226 may include data for each location within the fire area corresponding to the type of land cover at each location. Such data could include, for example, the thickness of vegetation, rockiness, softness of the soil, barriers like fences or cliffs, among others. Any spatial component that could impact movement of the crew may be included in the land cover map. Crew model 206 may use the land cover map 226 to predict the rate of travel of the firefighting crew.

Crew model 206 may use some or all of the above information, along with others, to predict the rate of travel of the firefighting crew. Crew model 206 may use the digital elevation model 218 to calculate the slope of the terrain and use the slope of the terrain to predict the rate of travel of the firefighting crew. The crew model 206 may also predict that maximum possible travelling distance in one or more directions away from the crew's current location. As route finder 208 creates possible escape routes via one or more route-finding algorithms, crew model 206 may predict the rate of travel of the crew from a first location to a second location. The first location may be a current location of the firefighting crew or a future location of the firefighting crew. The second location may be spaced apart from the first location. A line joining the first location to the second location may be oriented in any direction.

Example 3

Figure 5:
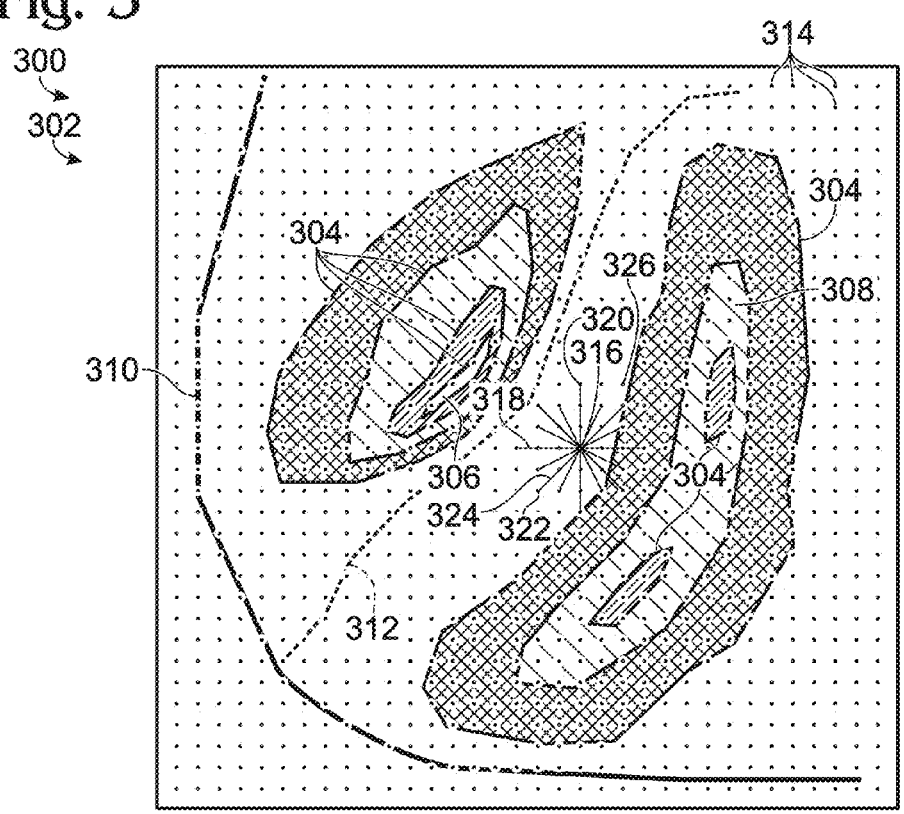
FIG. 5 is a schematic illustration of a step in an escape route-finding algorithm including a spatiotemporal spanning tree.
Figure 6:
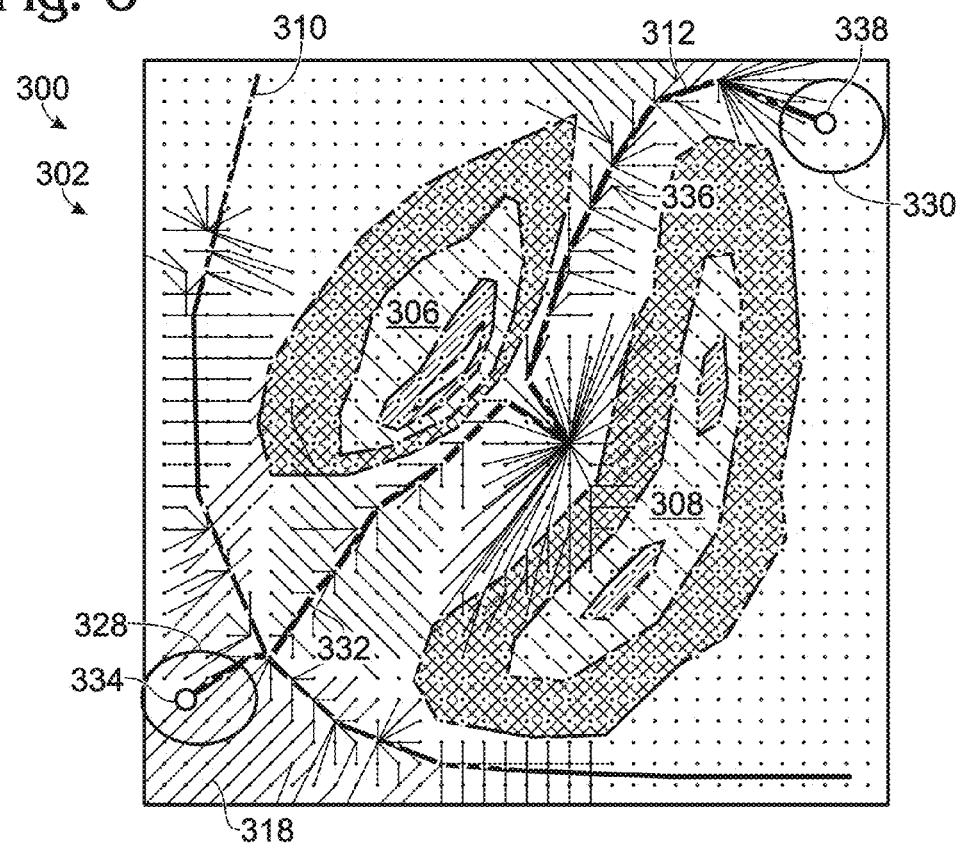
FIG. 6 is a schematic illustration of a later step in the escape route-finding algorithm including a spatiotemporal spanning tree.

This example describes an illustrative route-finding algorithm utilizing a minimal cost spatiotemporal spanning tree, which may be used in conjunction with any of the systems, methods, or apparatuses described herein; see FIGS. 5-6. In particular, this algorithm may be used by route finder 208 in the production of the one or more escape routes 210.

FIG. 5 is a schematic illustration of an exemplary step in an exemplary escape route-finding algorithm including a spatiotemporal spanning tree. That is, one possible way for route finder 208 to produce one or more escape routes is by employing an algorithm that uses a spanning tree, though other algorithms are possible; see Example 4. FIG. 5 shows one step of a possible implementation of such a spanning tree algorithm.

More specifically, FIG. 5 depicts a topographical map 300 of a fire area 302. Topographical maps include a set of contour lines 304, each line being the locus of points having the same elevation. Contour lines can thus indicate geographical features, for example, a hill 306 and a ridge 308. Topographical map 300 further includes an unimproved road 310 and a hiking trail 312. The topographical or elevation information, as well as the location of any roads or trails, may be contained in GIS data in data 202.

A minimal cost spatiotemporal spanning tree algorithm may begin by overlaying a grid of nodes 314 on topographical map 300. In FIG. 5 the grid nodes 314 are arranged uniformly and are aligned along a set of Cartesian x-y axes, though this need not be the case. The grid node spacing need not be regular or Cartesian. In areas where route-finding is difficult, due to topography or the behavior of the fire, the grid spacing between nodes may be decreased. FIG. 5 indicates a two-dimensional grid of nodes. However the route-finding algorithm may employ a three-dimensional grid of nodes: two spatial dimensions and one dimension of time, that is, a 3-D spatiotemporal grid. A 3-D spatiotemporal grid may account for the progress of the fire, as a location that may be dangerous at a first time due to proximity to the fire may be safe at a later, second time if the fire has passed.

In the example shown in FIG. 5, a firefighting crew is located at a first position 316 between hill 306 and ridge 308. The spanning tree algorithm may continue by selecting position 316 as a starting point for a spanning tree 318. At each step of the algorithm the spanning tree may grow. The spanning tree may grow until every node in the fire area has been reached. Each step in the algorithm may represent an interval of time, for example, one half of one hour. Thus, the outer edge 320 of the spanning tree after a certain number of steps of the algorithm may represent the maximum distance travelled by the crew in the amount of time represented by those steps of the algorithm. FIG. 5 shows spanning tree 318 after one such algorithmic step corresponding to 0.5 hours. After 0.5 hours spanning tree has made little progress up the slope of ridge 308 (only crossing one or two grid nodes) but more progress down towards trail 312 (crossing two or three grid nodes).

An exemplary first step of the spanning tree algorithm may be as follows. The spanning tree algorithm potentially used by route finder 208 may consider a particular grid node, for example, node 322. The algorithm may determine if the crew could travel from the first position 316 to node 322 in 0.5 hours, based on the slope of the terrain between those locations, the crew model 206, and the data used by crew model 206, among others. If the crew could in fact travel from position 316 to node 322 in 0.5 hours or less, then a branch 324 of the spanning tree may be created between the two grid points. When considering another grid point, for example, node 326, the algorithm may determine that the crew could not reach node 326 in 0.5 hours. Thus, a branch of spanning tree 318 may not be created between position 316 and node 326 during this step of the algorithm. In this manner the spanning tree algorithm may find all the grid nodes capable of being reached by the crew in 0.5 hours and create branches of the spanning tree from positions 316 to those grid nodes.

During an exemplary next step of the spanning tree algorithm, the route finder may determine the maximum travelling distance from position 316 in 1.0 hour. In the subsequent step, the route finder may determine the maximum travelling distance from position 216 in 1.5 hours, etc.

FIG. 6 shows the topographical map 300 of fire area 302 and the spanning tree 318 after several more steps of the algorithm. At this stage of the algorithm, the spanning tree has made some progress along hiking trail 312 and even more progress along the unimproved road 310. However, the spanning tree had made little progress up the side of ridge 308 and even less up the side of hill 306. The relative progress of the spanning tree along these different routes makes intuitive sense, as the firefighting crew would travel faster along established routes and slower up steep inclines.

The spanning tree algorithm may continue until every grid node in the fire area has been reached at least once by spanning tree 318. Alternately, the spanning tree algorithm may continue until at least one node located within a safe zone or safe area has been reached by the spanning tree. The spanning tree algorithm may stop at any appropriate stage. A grid node may be reached by more than one branch of the spanning tree.

The route finder may allow for the possibility of the crew resting. As the spanning tree in generated, the route finder may be in communication with crew model 206. Crew model 206 may predict that the crew will begin to slow down if they are continuously moving and may be able to move faster if they take a rest. Resting in the spanning tree algorithm may correspond to a branch of the three-dimensional spanning tree that extends in the time direction but not the two spatial directions.

Once the spanning tree has either filled the entire fire area, or been stopped by some other means, the route finder 208 may determine all the grid nodes located within safe areas or safe zones. The location of safe areas may be part of GIS data pertaining to the fire area, may be determined by remote sensing, or may be determined by humans with knowledge of the fire area, among other possible sources. Two safe areas 328 and 330 are depicted in FIG. 6. Route finder 208 may then find a route from position 316 to each of the grid nodes within each safe area within spanning tree 318. For example, route finder 208 may find route 332 to grid node 334 within safe area 328 and route 336 to grid node 338 within safe area 330.

Route finder 208 may calculate a "cost" of the crew traversing a piece of ground. For example, route finder 208 may calculate a cost of the crew travelling between two grid nodes 314 in the fire area 302. The cost may be a probability of the fire being located at a particular position at the same time that the firefighting crew is located at that particular position. Route finder 208 may determine the cost of traversing a piece of ground, at least in part, by the output of the fire model 204.

Route finder 208 may determine the cost of traversing a piece of ground at the same time that the spanning tree algorithm is creating spanning tree 318. Alternately, the cost may be determined after the spanning tree algorithm has been completed.

A total cost of a route may be calculated by adding up the cost along every piece of the route. Alternately, a total cost of a route may be the maximum cost of any piece along the route. The total cost of a route may be used to determine a degree of risk or a safety rating of a route. A route with a higher total cost may be determined to have a higher degree of risk and/or a lower safety rating, and vice versa.

As described in more detail in reference to FIG. 9 below, if no routes are found having a sufficiently low degree of risk the route finder may start over assuming a faster rate of travel for the crew. The crew may travel faster if they dropped some of the equipment or some other load being carried by the crew. As depicted in FIG. 2 and described above, the route finder 208 uses information, data, or output of the crew model 206 which may determine the travelling speed of the crew. As described in reference to FIG. 4, if the crew load changes, the predicted travel rate of the crew may also change.

The route finder may use the spanning tree algorithm to create one or more potential escape routes to every grid node within one or more safe areas and a total cost associated with each potential escape route. The algorithm may rank or order the potential escape routes by cost, with the least costly routes ranked or ordered first. Thus, the algorithm may be said to employ a minimal cost spatiotemporal spanning tree.

Example 4

Figure 7:
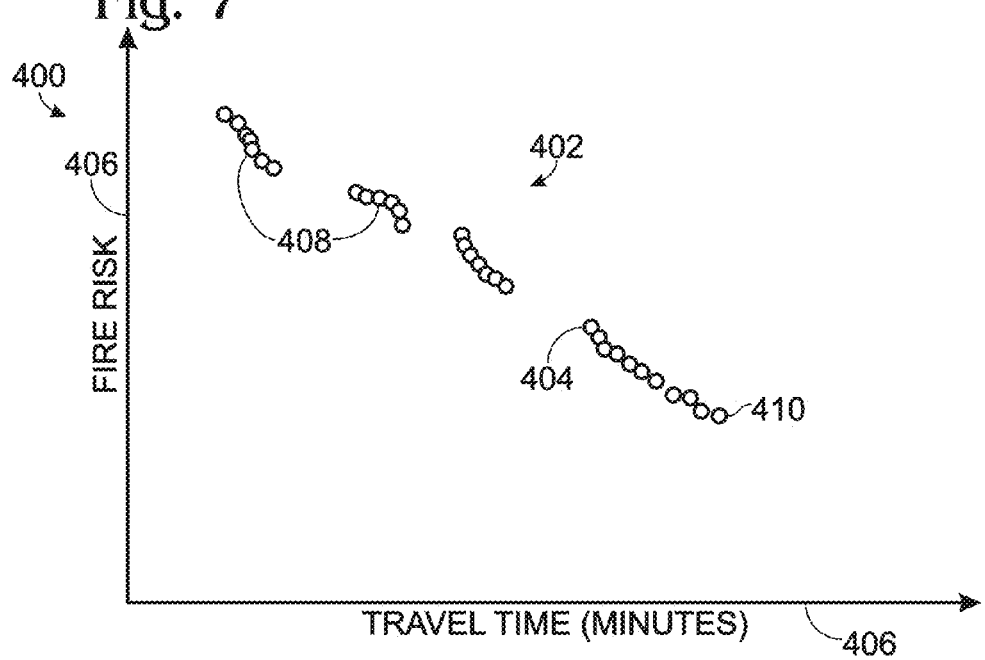
FIG. 7 is a schematic illustration of another route-finding algorithm involving an evolutionary computing multi-objective optimization scheme.

This example describes another illustrative route-finding algorithm utilizing an evolutionary computing multi-objective optimization scheme, which may be used in conjunction with any of the systems, methods, or apparatuses described herein; see FIG. 7. In particular, this algorithm may be used by route finder 208 in the production of the one or more escape routes 210.

There are many possible ways to implement evolutionary computing to determine one or more escape routes, as would be known by a person skilled in the art. One possible implementation would begin with two locations: a first location that may be the current location of a firefighting crew, and a second location that may be located within a safe area. Given these two positions, an initial arbitrary path between the two positions may be chosen. The "evolutionary" part of evolutionary computing may then be to add a small random change to the initial arbitrary path and then compare the two paths by some criteria. If the new path is deemed better than the original by the chosen criteria, then the random change will be kept and the process repeats by adding another small random change. If the new path is deemed worse than the original by the chosen criteria, then the random change will not be kept and the process repeats by adding another small random change. Thus, the algorithm proceeds as inspired by evolution by natural selection in the field of biology. The process may proceed until no better path can be found.

The random changes to the paths may be in any of the spatial or temporal directions. A change in a spatial direction may be a different route through a portion of the fire area. A change in a temporal direction may to add a period of rest to the route where the firefighting crew would not move.

In a multi-objective optimization scheme it may be that the criteria by which the different potential routes are judged include more than one objective to be optimized. For example, it may be the case that route finder 208 is configured to minimize the travel time of a crew along an escape route to a location within a safe area and minimize the degree of risk along the escape route. Such an optimization scheme is not limited to two objectives, nor is it limited to these two particular objectives. There are several different methods of performing multi-objective optimization in conjunction with evolutionary computing. In some of these methods instead of producing a single route between two points a family of routes between the two points may be produced. In this case some higher-level information may be used to choose a particular route from the family of routes. For example, one of the objectives may be determined to be more important than the others. Minimizing the travel time may be preferable but ultimately not as important as the safety of the crew, thus route finder 208 may choose the route with the least degree of risk from the family of routes between the two points.

Route finder 208 may use such an evolutionary computing multi-objective optimization algorithm to produce an escape route from the current location of the crew to each of one or more locations within one or more safe areas. FIG. 7 is a graph 400 representing an exemplary set 402 of one or more escape routes 210. Each dot 404 on graph 400 may represent a single escape route having fixed locations for endpoints, each escape route having been produced via an evolutionary computing multi-objective optimization algorithm. Graph 400 may have two or more axes 406 corresponding to the multiple objectives used by the evolutionary computing multi-objective optimization algorithm. In the example depicted in FIG. 7 the axes of graph 400 correspond to a degree of risk along an escape route for the firefighting crew and a time of travel along an escape route.

The escape routes 404 may clump together in one or more clusters 408. A cluster of escape routes may correspond to escape routes to multiple locations within the same safe area. The clusters 408 depicted in graph 400 have a somewhat negative slope. For example, the route corresponding to dot 404 may have a higher degree of risk but require less travel time than the route corresponding to dot 410. The clusters need not have a negative slope as it may be possible for one escape route to be less risky and require less travel time than a second escape route.

Graph 400 may or may not be presented to a user in order to choose a particular escape route. In the case where graph 400 is not presented to a user, the route finder 208 may choose a route 404 from each cluster 408 to display to a user. The route finder may choose a route using the same higher-level information used to choose a route from the family of routes between two points described above. Alternately, all the escape routes to a particular safe area may be displayed to the user who may then choose an escape route. See the discussion related to FIG. 9 for more details on a process of choosing an escape route.

Example 5

This example describes a method of facilitating the evacuation of a firefighting crew, which may be used in conjunction with any of the systems, methods, or apparatuses described herein; see FIGS. 8-12.

FIG. 8 depicts multiple steps of a method, generally indicated at 500, which may be performed in conjunction with any systems, methods, and/or apparatuses according to the present disclosure. Although various steps of method 500 are described below and depicted in FIG. 13, the steps need not necessarily all be performed, some steps may be repeated, and in some cases may be performed in a different order than the order shown. Method 500 may be performed in part by an escape route planning system and be implemented in a processor or other computing system.

Method 500 may include a step 502 where an escape route planner creates one or more escape routes. The escape route planner may be escape route planner 200. The escape route planner may utilize one or more route-finding algorithms, such as the exemplary algorithms described in Examples 3 and 4 above, to create one or more escape routes. The one or more escape routes may be routes that a wildland firefighting crew could take from the crew's current location to locations in one or more safe areas. However, method 500 may be used in other situations besides wildland fires, such as fires in urban settings, floods, earthquakes, or other natural or man-made disasters. Further, method 500 may be used by other people besides firefighters, such as police, other emergency response personnel, or private citizens.

Method 500 may include a step 504 where a user selects a route. The route may be one of the one or more escape routes created by the escape route planner. The user may be a firefighter in a firefighting crew. The user may be a fire operations manager in communication with the firefighting crew. Some or all of the one or more escape routes created by the escape route planner may be displayed to a user during the route selection process.

Figure 10:
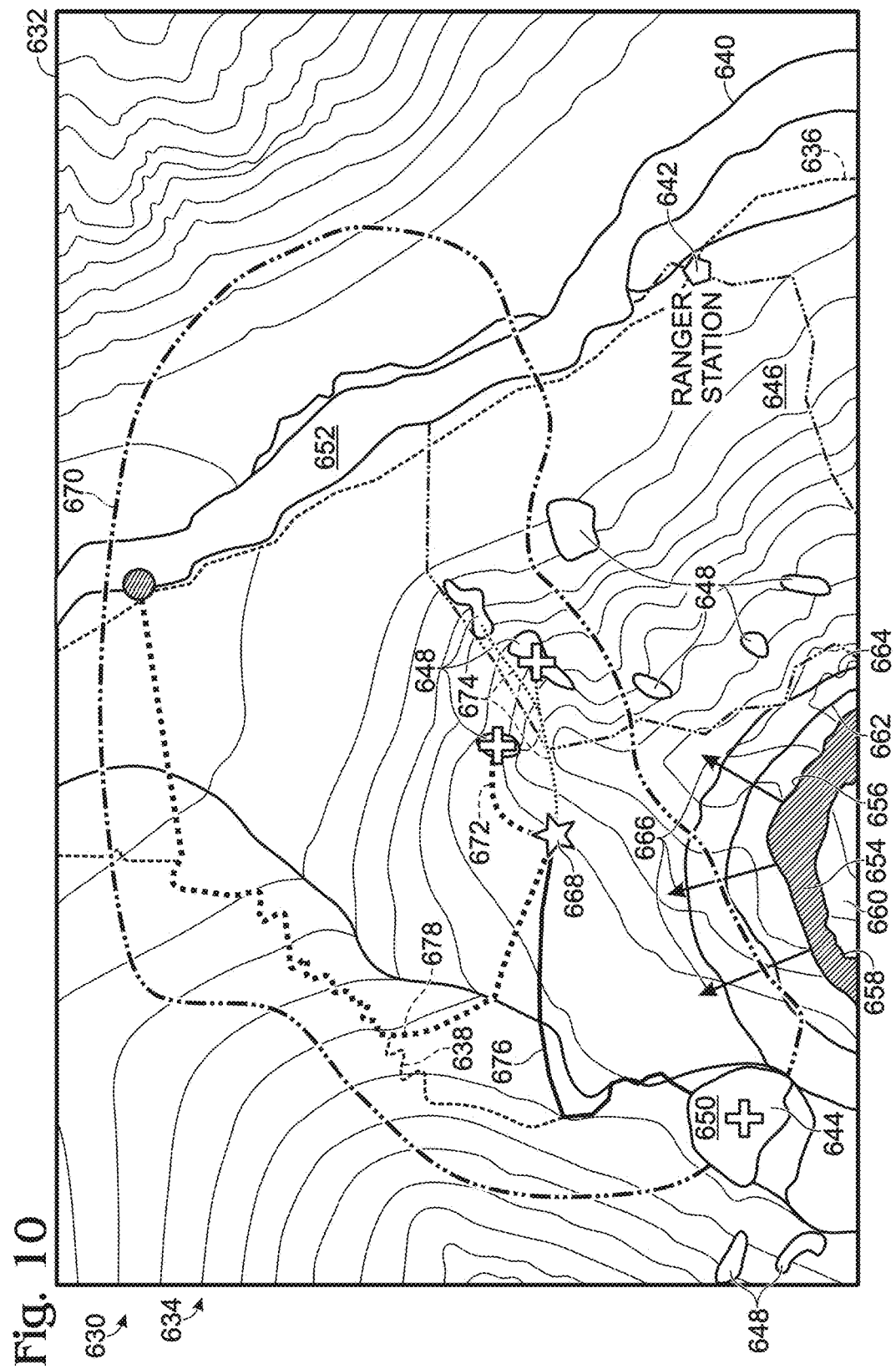
FIG. 10 is an example of a user display depicting geographical information, a current location and future locations of a fire, a current location of a firefighting crew, a plurality of safe zones, and evacuation routes to the plurality of safe zones.

FIG. 9, described below, is an example of operations that may be performed by an escape route planning system and a user during a route selection process. FIG. 10, described below, is an exemplary user display that the user may see during a route selection process.

Method 500 may include a step 506 where progress along a selected route is monitored. In the case where a firefighting crew is moving along a selected evacuation route, the escape route planning system may monitor the progress of the crew as it moves along the chosen route. If conditions regarding the fire, the crew, or the safe area to which the crew is travelling change the escape route planning system may return to step 504 and the user may select a different route from the one or more escape routes. If the conditions change by a sufficient amount, the escape route planning system may return to step 502 where the escape route planner may create a new set of one or more escape routes.

In another possible scenario, if the crew is not making adequate progress along the chosen route, then the escape route planning system may deem the chosen route to be less safe than it was previously considered to be. The escape route planning system may then return to step 504 for the user to select a different route or to step 502 for the escape route planner to create a new set of one or more escape routes.

Figure 11:
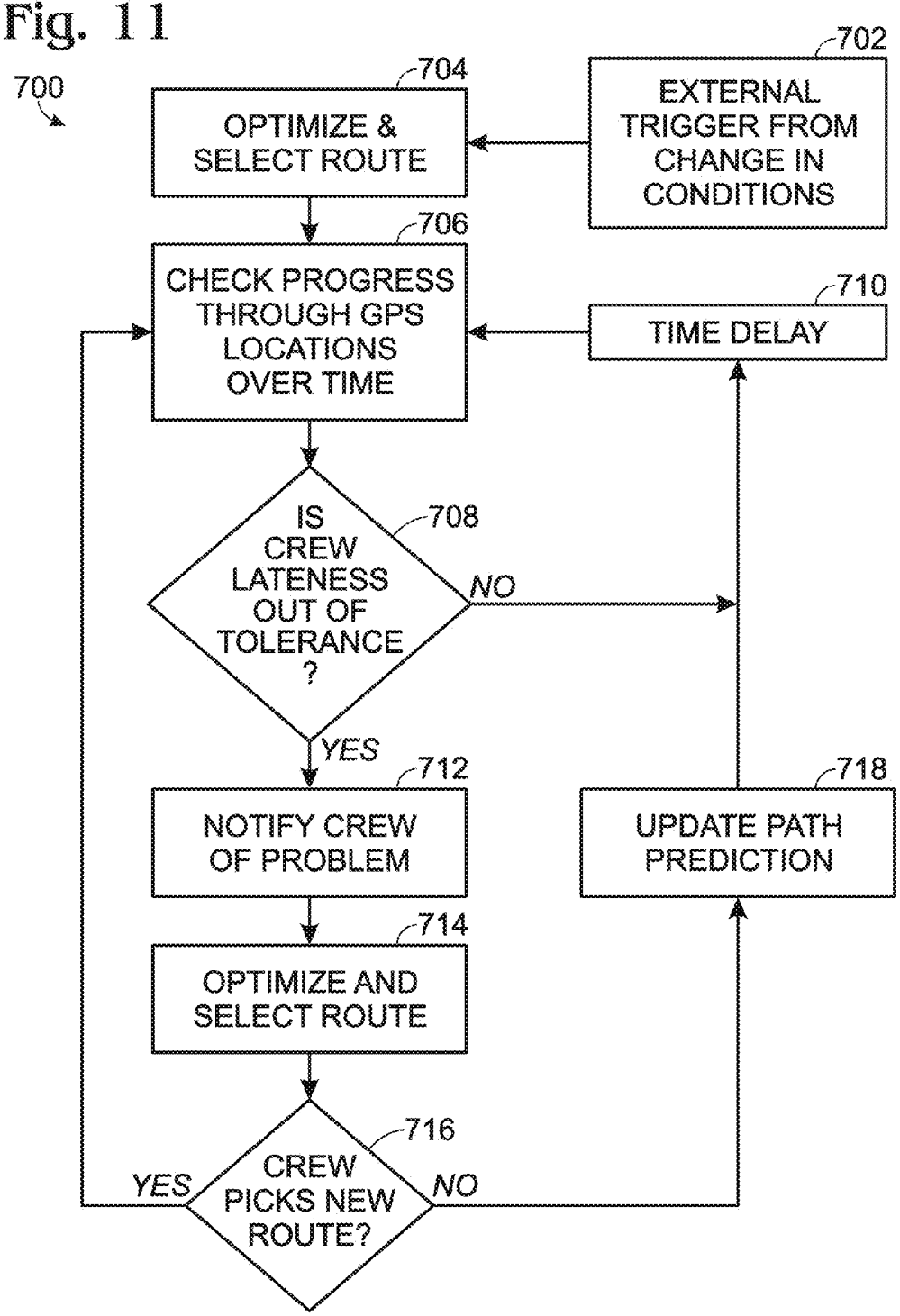
FIG. 11 is a flow chart illustrating an exemplary method of monitoring the progress of a firefighting crew along a selected evacuation route.
Figure 12:
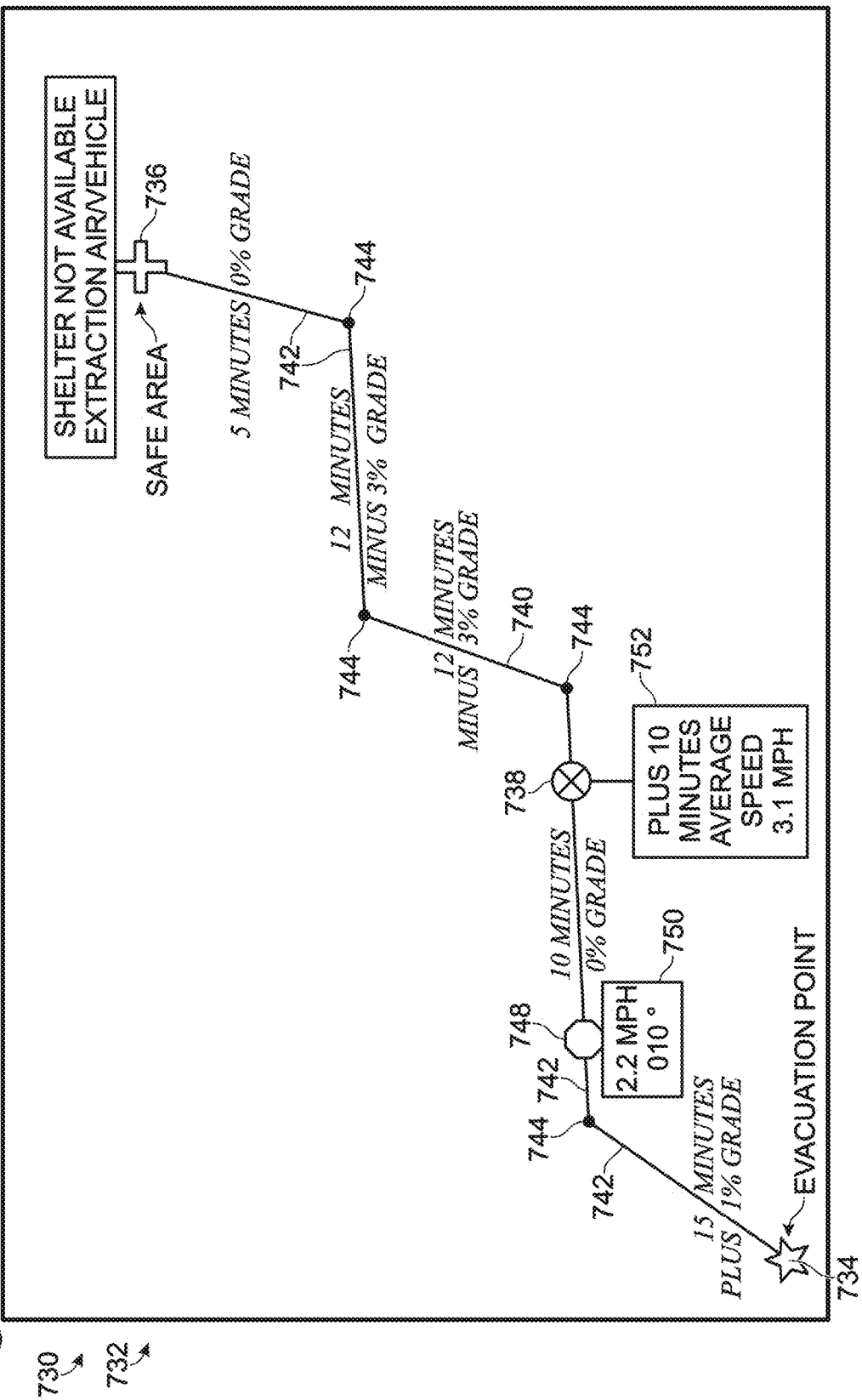
FIG. 12 is an example of a user display depicting a selected evacuation route to a safe area, a current location of a firefighting crew, and point moving along the selected evacuation route at a minimum safe travelling speed.

FIG. 11, described below, is an example of operations that may be performed by an escape route planning system and a user during monitoring of progress along a selected route. FIG. 12, described below is an exemplary user display that the user may see during monitoring of progress along a selected route.

FIG. 9 is an illustration of operations, generally indicated at 600, which may be performed by an escape route planning system and a user during a route selection process. Some or all of operations 600 may be implemented in a processor.

Operations 600 may include a step 602 of producing one or more escape routes. Step 602 may be the same as step 502 of method 500 described above.

Operations 600 may include a step 604 of determining if any feasible routes have been found. An escape route may be determined to be feasible if the route has a degree of risk below a specified risk threshold. It may be the case that no feasible routes have been found by the escape route planner. If so determined, operations 600 may proceed to step 606 of reducing the crew load by dropping equipment, and may return to step 602. Since the crew may be able to move faster if they are carrying less equipment the escape route planner may now be able to find one or more escape routes having a sufficiently low degree of risk. If there are still now feasible routes found, operations 600 may again proceed through steps 606 and 602 until at least one feasible route is found.

In an exceptional case there may be no amount of equipment that could be dropped by the firefighting crew in order to find a feasible escape route. While this situation may be dire it may still be very useful for the firefighting crew or a fire manager in communication with the crew to know that no feasible escape routes exist. If this determination is made with sufficient time the crew may be able to take steps to create their own safe areas, such as by starting small fires to clear an area of fuel and deploying emergency shelters. Alternately, an aircraft carrying fire retardant or water could be directed to the position of the crew in an attempt to provide them with protection.

If at least one feasible route is found, the operations 600 may proceed to a step 608 of listing the feasible safe areas. The feasible safe areas may be those areas or locations to which one or more of the escape routes are directed. A safe area may be deemed feasible if there is at least one escape route to that safe area that has a degree of risk below the specified risk threshold.

Following step 608, operations 600 may proceed through one of two branches towards a step 614 of a user selecting a route. One branch may begin with a step 610 of displaying a least risky route to each safe area to a user. From step 608 where the feasible safe areas were listed, the escape route planning system may select the least risky route to each safe area and display those routes to a user. The user may be a member of a firefighting crew and the routes may be displayed on a mobile computing device in the member's possession. The user may be a fire operations manager at a control location removed from the fire and the routes may be displayed on any appropriate device. The least risky routes and corresponding safe areas may be displayed over a map of the fire area. The least risky routes may be displayed in similar format or may be color-coded to indicate a rating of the relative degree of risk associated with each route.

Operations 600 may include a step 612 of allowing a user to get extra information for each of the displayed routes. The user may get the extra information by selecting one of the displayed routes. If the routes are displayed on a mobile computing device such as a tablet or a phone including a touch screen the user may select a displayed route by touching the screen proximate the displayed image of the route. Alternately, a keyboard, mouse, or any other appropriate means may be used to select a route. The extra information may be details about the selected route, for example but not limited to: the projected travel time along the route, the elevation gained and/or lost along the route, the slope of the terrain along the route, the degree of risk associated with the route, a length of the route, a list of the services available at the associated safe area, a projected speed of travel along the route, a minimum safe travelling speed along the route, or any other useful or relevant information.

Operations 600 may include a step 614 of a user selecting a route. The user may select a route from the least risky routes displayed in step 610. Once an escape route has been selected the firefighting crew may then proceed along the selected route to the designated safe area. If the user who selects the route is not a member of the crew, the user may then communicate the selected route to the crew.

Alternately, operations 600 may proceed from step 608 to a step 616 of highlighting the feasible safe areas on a display. That is, the feasible safe areas from step 608 may be displayed to a user on a screen. The feasible safe areas may be overlaid on a map of the fire area and the feasible safe areas may be highlighted in some way. For example, the borders or edges of the feasible safe areas may be colored to distinguish the feasible safe areas from the unfeasible safe areas. Alternately, the entire surface areas of the feasible safe areas may be colored. The colors used to distinguish the feasible safe areas may carry other information about the route to that area or the area itself. For example, the feasible safe areas may be color coded to indicate the degree of risk associated with routes to that area, or to indicate the time required to reach the feasible safe areas, though other choices are possible as well and within the scope of the present disclosure.

The feasible safe areas may be highlighted by an icon or other visual indication. If icons are used to distinguish the feasible safe areas from the unfeasible safe areas, the icons may all be identical or may be used to indicate extra information about the safe area and/or the route to that safe area. For example, the icons may indicate what sort of services may be available at the various safe areas, for example but not limited to: the presence of supplies such as food and water, the availability of vehicles for purposes of crew extraction, the availability of medical supplies, or other information. As in step 610 the highlighted feasible safe areas may be displayed to a user inside the fire area or a user outside the fire area capable of communicating with those inside. Operations 600 may include a step 618 of a user selecting a feasible safe area.

The user may select a feasible safe area by using a touchscreen, keyboard, mouse, or any other appropriate means.

Operations 600 may include a step 620 of displaying routes to the selected safe area. Step 620 may proceed automatically from step 618 or it may require additional input from the user. The displayed routes may be color-coded to indicate a rating of a degree of risk associated with each route. The rating of the degree of risk may be based in part on the estimated rate of travel or difficulty associated with traversing the ground cover and terrain slope along each of the routes. The routes to the selected safe area may be different routes to different locations within the selected safe area or may be different routes to the same location within the selected safe area.

Operations 600 may include a step 622 of allowing a user to get extra information on the displayed routes. Step 622 may be substantially similar to step 612. The escape route planning system may allow a user to return to step 618 from step 622 and select a new feasible safe area.

A user may select an escape route at step 614 after participating in some or all of steps 610 and 612 and/or after participating in some or all of steps 616, 618, 620, and 622.

FIG. 10 is an example of a user display, generally indicated at 630, that may be used in a route selection process such as is described in reference to FIG. 9. Display 630 may include a map 632 overlaid with different kinds of information relating to a fire, a fire area, a firefighting crew, and one or more escape routes. Display 630 may include all or a subset of the following elements and/or information. The exemplary map 632 depicted in FIG. 10 corresponds to the exemplary fire area 100 in FIG. 1.

Map 632 may be a topographical map of a fire area 634, with contours indicating locations having the same elevation. Map 632 may have GIS data, for example a road 636, a hiking trail 638, a river 640, a ranger station 642, a lake 644, among others. These examples are all particular to the exemplary fire area 634 and any sort of GIS data may be appropriate depending on the location of a fire. Map 632 may include information from data 202 from the escape route planner 200. For example, map 632 may have information from a fuel map of the fire area. Fire area 634 includes a low fuel area 646 where a previous fire removed much of the available combustible material.

Display 630 may include various safe areas or safe zones where a firefighting crew may find refuge. The location and extent of the safe areas may be determined from GIS data, from observations of the fire area, or from remote sensing data. Fire area 634 has nine safe areas 648 corresponding to clearings in the surrounding forest, one safe area 650 corresponding to lake 644, and one safe area 652 corresponding to a river bed. These safe areas are particular to the exemplary fire area 634 and many different kinds of safe areas are possible, for example, roads, highways, parking lots, and bodies of water, among others.

Display 630 may include information related to a fire 654. For example, display 630 may include a current location 656 of a fire front and a current location of a back edge 658 of the fire. As described in Examples 1 and 2, this information may come from direct observation or from remote sensing data. Display 630 may include an area 660 previously burned by fire 654. The escape route planning system may use a fire model, such as fire model 204, to predict a future location 662 of the fire front at a first later time and a future location 664 of the fire front at a second later time after the first later time. Along with or in place of the future locations 662 and 664 of the fire front, display 630 may include arrows 666 indicating a direction of travel and a travel speed of the fire.

Display 630 may include information related to a firefighting crew. A current location 668 of the crew may be indicated by an icon. The current location of the crew may be determined from GPS units carried by one or more of the crew, or may be communicated from the crew to an operation center by radio, telephone or other means. A crew model, such as crew model 206, may determine an endurance envelope 670 for the firefighting crew, among other quantities. The endurance envelope 670 may represent the maximum travelling distance of the crew from their current location given factors such as the size of the crew, a measure of the strength of the crew, the terrain the crew would have to traverse, the ground cover over the terrain the crew would have to traverse, and any other relevant data or information.

Display 630 may include information related to one or more escape routes. The escape routes may be determined by an escape route planner, such as escape route planner 200. The escape route planner may determine all safe areas located within the endurance envelope of the firefighting crew and may produce one or more escape routes to each of the safe areas within the endurance envelope. The example depicted in FIG. 10 includes an escape route 672 to nearby safe area 648, two escape routes 674 to safe areas 648 located within low fuel area 646, an escape route 676 to safe area 650 at the lake 644, and an escape route 678 to safe area 652. The escape routes may have different visual properties in order to indicate a rating corresponding to a degree of risk associated with each route. For example, routes 672 and 678, depicted in dashed lines in FIG. 10, may be colored green to indicate a low degree of risk. Routes 674 may be colored yellow to indicate a moderate degree of risk. Route 676 may be colored red to indicate a high degree of risk. Alternately, the safe areas themselves may have visual indication of the degree of risk associated with the escape routes to those areas. In another alternative, the degree of risk associated with each route may be represented by a number displayed near each route, for example with higher numbers meaning more relative risk.

FIG. 11 is an illustration of operations, generally indicated at 700, which may be performed by an escape route planning system and a user during monitoring of progress along a selected route. Some or all of operations 700 may be implemented in a processor.

Operations 700 may include a step of an external trigger from a change in conditions. The change in conditions may be a change in conditions related to a fire or the future projected progress of the fire. A location of a firefighting crew may change from relatively safe to relatively unsafe given such a change in conditions and the evacuation of the crew may be deemed to be necessary. An escape route planning system may then produce and/or optimize one or more escape routes for the crew.

Operations 700 may include a step 704 of optimizing and selecting a route. Example route optimization schemes are described in reference to Examples 3 and 4 above and an example route selection process is described in reference to FIGS. 9 and 10 above.

Once an escape route has been selected the crew may proceed along the chosen route. Operations 700 may include a step 706 of checking the progress of the crew through GPS locations over time. In the case where the firefighting crew is carrying one or more GPS units the escape planning system may monitor the location of the crew. The location of the crew may be checked by the escape route planning system at regular time intervals or continuously. The progress of the crew may be determined by the system by considering an initial location of the crew when the decision was made to evacuate, a current position of the crew in substantially real-time, and a planned destination of the crew in a safe area.

As the crew travels along the selected route, the escape route planning system may update the rate of fire progression relative to an actual rate of travel of the firefighter. The progression of the fire may be monitored continuously or at discrete time intervals. The actual rate of travel of the crew may be determined from the locations of the crew over time.

Operations 700 may include a step 708 of determining if the crew lateness is out of tolerance. The selected escape route that the firefighting crew may be progressing along may have been created by an escape route planner, such as escape route planner 200. The route may have been created by projecting a rate of travel for one or both of the fire and the crew. The escape route planning system may make a similar calculation where a minimum safe travelling speed along the chosen route is determined. The minimum safe travelling speed may be the slowest speed along the route where the crew can stay ahead of the fire. The minimum safe travelling speed may be a constant speed or it may change along the route.

If the crew is travelling slower than their projected speed the crew may be said to be late. The lateness of the crew may be tolerated by the escape route planning system as long as the crew is moving faster than a point moving at the minimum safe travelling speed. If the crew is travelling slower than the minimum safe travelling speed or the crew falls behind the point moving at the minimum safe travelling speed along the route, then the lateness of the crew may be said to be out of tolerance. If the crew is travelling faster than the minimum safe travelling speed or if the crew is ahead of a point moving along the chosen route at the minimum safe travelling speed, then the lateness of the crew may not be out of tolerance.

If the lateness is not out of tolerance, then operations 700 may proceed to a step 710 of a time delay. The time delay of step 710 may be any appropriate time for the escape route planning system to wait to again check the location of the crew, perhaps through a GPS unit or units carried by the crew. Operations 700 may return to step 706 once the time associated with the time delay has elapsed.

If the lateness of the crew is determined to be out of tolerance, operations 700 may proceed to a step 712 of notifying the crew of a problem. The escape route planning system may notify the crew by sending a message or other alert to a mobile device in the crew's possession. The crew may alternately be notified by radio or phone communication with a person located outside the fire area or at a different location within the fire area.

Operations 700 may include a step 714 of optimizing and selecting a new route. Step 714 may be substantially the same as step 704 described above, however perhaps assuming a different starting location for the crew than was considered in step 704 and different fire and weather conditions than were considered at step 704.

Operations 700 may include a step 716 of determining if the crew has selected a new route. If it is determined at step 716 that the crew has selected a new escape route, then operations 700 may return to step 706. If the crew has not selected a new escape route, operations 700 may proceed to a step 718 of updating the path prediction. Alternately, the new route may be chosen by someone other than the firefighting crew, such as a fire manager in communication with the crew. Updating the path or route prediction may include updating a degree of risk associated with the chosen route, the minimum safe travelling speed required along the chosen route, or any other quantity associated with the chosen route. Operations 700 may return to step 710 after step 718.

FIG. 12 is an example of a user display, generally indicated at 730, that may be used during monitoring of progress along a selected route, such as is described in reference to FIG. 11. Display 730 may include a map 732 overlaid with different kinds of information relating to a chosen escape route. Display 730 may include all or a subset of the following elements and/or information.

Display 730 may include an evacuation point 734, a destination point 736, a current location 738, and an escape route 740. Evacuation point 734 may represent the location of the crew when the decision was made to evacuate the crew and/or the escape route 740 was chosen. Display 730 may include a map of the area and may include the current location of the fire, such as in FIG. 10.

Destination point 736 may be the location to which the crew is travelling along route 740 and may be located with a safe area. Destination point 736 may have one or more available services, such as available water, medical supplies, equipment, or vehicles for crew extraction, among others. Destination point 736 may be represented by an icon. If the destination point is represented by an icon, the icon may visually indicate the available services at that location. Alternately, the services that may or may not be available may be listed proximate the destination point 736.

Current location 738 may represent the location of one or more members of the firefighting crew. The location may be determined by one or more GPS units carried by the crew or may be relayed to a user at a different location by radio or phone.

Escape route 740 may have been created by an escape route planner, such as escape route planner 200. Escape route 740 may have been chosen as described in reference to FIG. 9 above. Escape route 740 may include a set of path segments 742 between nodes 744. Nodes 744 may represent some geographical or physical feature such as a junction, a bridge, or any other relevant real-world feature. Nodes 744 may be a subset of a grid or other pattern of nodes added to the area by a route-finding system or algorithm, such as the route finding algorithm described in Example 3.

Display 730 may include extra information 746 associated with each path segment 742. Many different items may be included in extra information 746, including but not limited to, the projected time to traverse the given path segment, the average slope of the terrain along the path segment, the length of the path segment, the projected speed along the segment, and a degree of risk associated with the path segment, among others.

Display 730 may include a minimum position 748 along route 740. Minimum position 748 may be moving along route 740 at the minimum safe travelling speed, as described in reference to step 708 of operations 700 above. Moving along with minimum position 748 may be a fire information field 750. Fire information field may include information related to the fire, for example but not limited to, a current speed and directional heading of the fire, among others.

As described in reference to FIG. 11, the escape route planning system may monitor the progress of the crew along the chosen route. The crew or any other user may also monitor the progress of the crew along the chosen route by viewing, for example, a display such as display 730. If the current location 738 of the crew is ahead of the minimum position 748 along route 740 then the crew may be travelling at an adequate speed to reach the destination point 736 at the safe area ahead of the fire. If the current location 738 and the minimum position 748 begin to approach each other, then the crew may need to increase their speed in order to safely arrive at the destination point. If the current location 738 of the crew falls behind the minimum position, then the crew may need to choose another destination point within a different safe area, drop equipment in order to increase their travel speed, or take other measures to insure their safety.

Example 6

Figure 13:
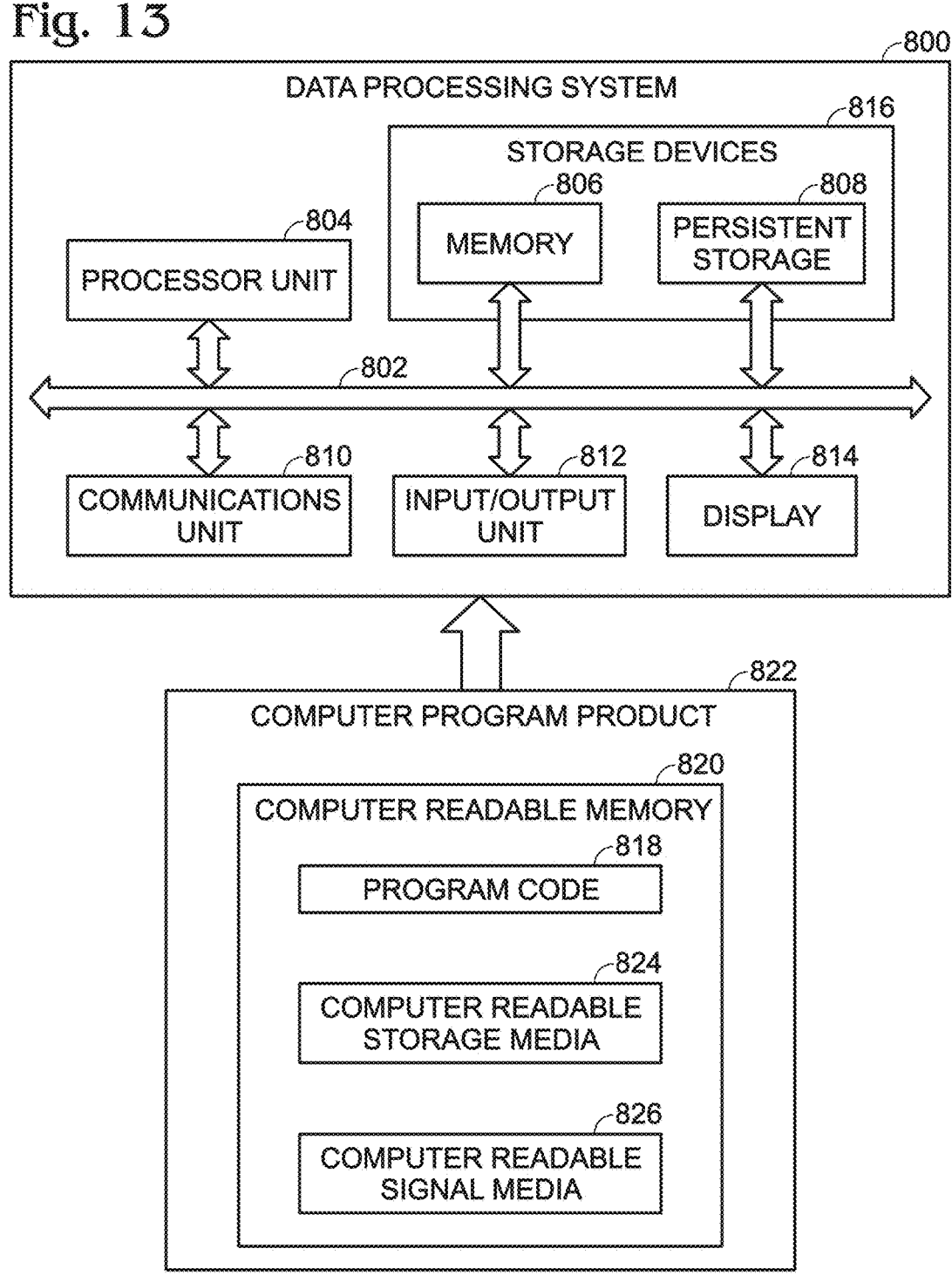
FIG. 13 is a schematic diagram of various components of an illustrative data processing system.

This example describes an exemplary data processing system and an illustrative computer network system, which may be used in conjunction with any of the systems, methods, or apparatuses described herein; see FIGS. 13-14.

As shown in FIG. 13, this example describes a data processing system 800 in accordance with aspects of the present disclosure. In this example, data processing system 800 is an illustrative data processing system suitable for implementing aspects of an escape route planning system. More specifically, in some examples, devices that are embodiments of data processing systems (e.g., smartphones, tablets, personal computers) may perform aspects of one or more of a route-finding algorithm, a route-selecting algorithm, and/or a progress-monitoring algorithm and associated user displays and interfaces.

In this illustrative example, data processing system 800 includes communications framework 802. Communications framework 802 provides communications between processor unit 804, memory 806, persistent storage 808, communications unit 810, input/output (I/O) unit 812, and display 814. Memory 806, persistent storage 808, communications unit 810, input/output (I/O) unit 812, and display 814 are examples of resources accessible by processor unit 804 via communications framework 802.

Processor unit 804 serves to run instructions that may be loaded into memory 806. Processor unit 804 may be a number of processors, a multi-processor core, or some other type of processor, depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and other suitable information either on a temporary basis or a permanent basis.

Storage devices 816 also may be referred to as computer-readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for user input through a keyboard, a mouse, and/or some other suitable input device. Further, input/output (I/O) unit 812 may send output to a printer. Display 814 provides a mechanism to display information to a user.

Instructions for the operating system, applications, and/or programs may be located in storage devices 816, which are in communication with processor unit 804 through communications framework 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program instructions, program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these examples. In one example, computer-readable media 820 may be computer-readable storage media 824 or computer-readable signal media 826.

Computer-readable storage media 824 may include, for example, an optical or magnetic disk that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory, that is connected to data processing system 800. In some instances, computer-readable storage media 824 may not be removable from data processing system 800.

In these examples, computer-readable storage media 824 is a physical or tangible storage device used to store program code 818 rather than a medium that propagates or transmits program code 818. Computer-readable storage media 824 is also referred to as a computer-readable tangible storage device or a computer-readable physical storage device. In other words, computer-readable storage media 824 is non-transitory.

Alternatively, program code 818 may be transferred to data processing system 800 using computer-readable signal media 826. Computer-readable signal media 826 may be, for example, a propagated data signal containing program code 818. For example, computer-readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer-readable signal media 826 for use within data processing system 800. For instance, program code stored in a computer-readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 13 can be varied from the illustrative examples shown. The different embodiments may be implemented using any hardware device or system capable of running program code. As one example, data processing system 800 may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications framework 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in communications framework 802.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

As shown in FIG. 14, this example describes a general network data processing system 900, interchangeably termed a network, a computer network, a network system, or a distributed network aspects of which may be included in one or more illustrative embodiments of an escape route planning system. For example, the functions of an escape route planner may be performed by a computing system outside of a fire area and the products of the escape route planner may be communicated across a network to a mobile computing device carried by a firefighting crew. It should be appreciated that FIG. 14 is provided as an illustration of one implementation and is not intended to imply any limitation with regard to environments in which different embodiments may be implemented. Many modifications to the depicted environment may be made.

Network data processing system 900 is a network of computers, each of which is an example of data processing system 800, and other components. Network data processing system 900 may include network 902, which is a medium configured to provide communications links between various devices and computers connected together within network data processing system 900. Network 902 may include connections such as wired or wireless communication links, fiber optic cables, and/or any other suitable medium for transmitting and/or communicating data between network devices, or any combination thereof.

In the depicted example, a first network device 904 and a second network device 906 connect to network 902, as does an electronic storage device 908. Network devices 904 and 906 are each examples of data processing system 800, described above. In the depicted example, devices 904 and 906 are shown as server computers. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 910, a client laptop or tablet 912, and/or a client smartdevice 914, may connect to network 902. Each of these devices is an example of data processing system 800, described above regarding FIG. 13. Client electronic devices 910, 912, and 914 may include, for example, one or more personal computers, network computers, and/or mobile computing devices such as personal digital assistants (PDAs), smart phones, handheld gaming devices, wearable devices, and/or tablet computers, and the like. In the depicted example, server 904 provides information, such as boot files, operating system images, and applications to one or more of client electronic devices 910, 912, and 914. Client electronic devices 910, 912, and 914 may be referred to as "clients" with respect to a server such as server computer 904. Network data processing system 900 may include more or fewer servers and clients or no servers or clients, as well as other devices not shown.

Client smartdevice 914 may include any suitable portable electronic device capable of wireless communications and execution of software, such as a smartphone or a tablet. Generally speaking, the term "smartphone" may describe any suitable portable electronic device having more advanced computing ability and network connectivity than a typical mobile phone. In addition to making phone calls (e.g., over a cellular network), smartphones may be capable of sending and receiving emails, texts, and multimedia messages, accessing the Internet, and/or functioning as a web browser. Smartdevices (e.g., smartphones) may also include features of other known electronic devices, such as a media player, personal digital assistant, digital camera, video camera, and/or global positioning system. Smartdevices (e.g., smartphones) may be capable of connecting with other smartdevices, computers, or electronic devices wirelessly, such as through near field communications (NFC), BLUETOOTH®, WiFi, or mobile broadband networks. Wireless connectively may be established among smartdevices, smartphones, computers, and other devices to form a mobile network where information can be exchanged.

Program code located in system 900 may be stored in or on a computer recordable storage medium, such as persistent storage 808 described in reference to FIG. 13, and may be downloaded to a data processing system or other device for use. For example, program code may be stored on a computer recordable storage medium on server computer 904 and downloaded for use to client 910 over network 902 for use on client 910.

Network data processing system 900 may be implemented as one or more of a number of different types of networks. For example, system 900 may include an intranet, a local area network (LAN), a wide area network (WAN), or a personal area network (PAN). In some examples, network data processing system 900 includes the Internet, with network 902 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. FIG. 14 is intended as an example, and not as an architectural limitation for any illustrative embodiments.

Advantages, Features, Benefits

The different embodiments of the escape route planning system described herein provide several advantages over known solutions for evacuating wildland firefighters from dangerous situations. For example, the illustrative embodiments of the escape route planning system described herein allow for the production of evacuation routes that take into account the projected progress of a fire as well as the projected travel speed of the firefighting crew. Additionally, and among other benefits, illustrative embodiments of the escape route planning system described herein allow the firefighting crew to be notified of potential safe areas within travelling distance and the relative risk of travelling to each of those safe areas. No known system or device can perform these functions, particularly in real-time as firefighting conditions change. Thus, the illustrative embodiments described herein are particularly useful for agencies charged with protecting lives and/or property from the advance of a fire. However, not all embodiments described herein provide the same advantages or the same degree of advantage.

Illustrative Embodiment Descriptions

This section describes additional aspects and features of escape route planning systems and related methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A forest fire real-time escape route planning system, comprising:

a processor that receives real-time Geographical Information System data, weather, and fire front information;

a firefighter endurance and route-planning model for determining, based on data received by the processor, one or more firefighter evacuation routes to one or more safe areas along with a rating for each evacuation route based on a degree of risk, the model predicting a rate of fire progression based on fire fuel proximate the fire; and a transmitting device for communicating the one or more firefighter evacuation routes along with the rating for each evacuation route to a mobile device configured to display the one or more firefighter evacuation routes overlaid on a map depicting a current location of a firefighter relative to the fire.

A2. The system of paragraph A1, wherein the model predicts a firefighter's endurance and an estimated rate of travel along each of the one or more evacuation routes.

A3. The system of paragraph A2, wherein the model continually updates the rate of fire progression relative to an actual rate of travel of the firefighter.

A4. The system of paragraph A3, wherein the transmitter transmits the model data for rate of fire progression and rate of travel of the firefighter to a mobile device configured to display a progression of the firefighter relative to the evacuation route.

A5. The system of paragraph A2, further comprising an algorithm that defines a plurality of spaced-apart nodes associated with a geographic model of the terrain, such that local terrain data is associated with each node, wherein the algorithm evaluates potential evacuation routes along a combination of different nodes based on the predicted rate of fire progression, terrain data and an estimate of the firefighter's endurance and rate of travel relative to the terrain, to determine the one or more evacuation routes and corresponding degree of risk.

A6. The system of paragraph A5, wherein the mobile device includes a software application that receives image data depicting a geographic area and fire front, and generates a display of a map of local terrain relative to the fire front, along with an overlay of at least one of the one or more evacuation routes.

A7. The system of paragraph A5, wherein the firefighter endurance and route-planning model is computed by an operations center system, which determines the one or more firefighter evacuation routes along with the rating for each evacuation route that are transmitted to one or more mobile devices.

A8. The system of paragraph A7, wherein the model further estimates a duration of time before the fire will progress to a given node based on weather-related data.

A9. The system of paragraph A1, wherein the rating for each evacuation route is based on a likelihood factor of whether the route crosses a fire-line.

A10. The system of paragraph A9, wherein the model creates a 2-dimensional grid defining a plurality of spaced nodes overlaid on a geographic model of the terrain.

B1. A forest fire real-time escape route planning system, comprising:

a processor that receives, into a database, real-time information pertaining to a geographical area, a fire located within the area, a firefighting crew located within the area, and weather in the area; and an escape route planner including the database of information, a fire model configured to predict a rate of fire progression based on information in the database, and an escape route finder configured to produce one or more firefighter escape routes, based on the fire model, to one or more safe areas and a safety rating for each escape route based on a degree of risk.

B2. The forest fire real-time escape route planning system of paragraph B1, wherein the escape route planner includes a crew model configured to predict a rate of travel of a firefighting crew and is configured to produce the one or more firefighter escape routes based on the crew model.

B3. The forest fire real-time escape route planning system of paragraph B1, further comprising a transmitting device for communicating the one or more escape routes and safety ratings to a mobile device configured to display the one or more escape routes and safety ratings, and wherein the escape route planner is an application running on the processor, the processor located remotely from the firefighting crew.

B4. The forest fire real-time escape route planning system of paragraph B1, wherein the escape route planner is an application running on the processor, the processor located within a mobile computing device held by the firefighting crew.

B5. The forest fire real-time escape route planning system of paragraph B1, wherein a display shows a map, a selected escape route, and the current location of the mobile device relative to a projected safe progression along the selected escape route.

C1. A method for facilitating the evacuation of a firefighting crew, comprising:

predicting a progression of a fire based on fire-related data;

determining, based on the predicted progression of the fire, one or more evacuation route(s) from an initial location of the firefighting crew to one or more safe area(s), such that the one or more evacuation route(s) to each safe area are unlikely to cross a fire line;

selecting an evacuation route;

displaying a map to a user, the map overlaid with the selected evacuation route and a current location of the firefighting crew.

C2. The method for facilitating the evacuation of a firefighting crew of paragraph C1, further comprising predicting a rate of travel of a firefighting crew based on crew-related data, wherein the one or more evacuation route(s) are determined based on the predicted rate of travel of the firefighting crew.

C3. The method for facilitating the evacuation of a firefighting crew of paragraph C2, further comprising monitoring a progress of the firefighting crew along the selected evacuation route.

C4. The method for facilitating the evacuation of a firefighting crew of paragraph C3, wherein selecting an evacuation route includes presenting a route selection map, with some or all of the one or more evacuation route(s) overlaying the route selection map, to a user on a display.

C5. The method for facilitating the evacuation of a firefighting crew of paragraph C4, further comprising predicting a minimum safe travelling speed along the selected evacuation route, wherein displaying the map to a user, the map overlaid with the selected evacuation route, includes overlaying the map with a point moving along the selected evacuation route at the minimum travelling speed.

C6. The method for facilitating the evacuation of a firefighting crew of paragraph C5, wherein the user is a member of the firefighting crew, and the display on which is presented the route selection map, and the selected evacuation route, is included in a mobile computing device carried by a member of the firefighting crew.

C7. The method for facilitating the evacuation of a firefighting crew of paragraph C1, wherein the fire-related data is one or more of the following: an observed fire front, weather data, terrain data, and/or a fuel map of the area.

C8. The method for facilitating the evacuation of a firefighting crew of paragraph C1, wherein the crew-related data is one or more of the following: a measure of the crew size, a measure of the crew strength, a crew load carried by the crew, and/or a land cover map.

C9. The method for facilitating the evacuation of a firefighting crew of paragraph C3, where monitoring the progress of the firefighting crew is aided by one or more GPS unit(s) carried by the firefighting crew.

D1. A forest fire real-time escape route planning system, comprising:
a processor that receives real-time information regarding a geographical area, a fire located within the area, a firefighting crew including individual members located within the area, and weather in the area;
a fire model that has fire-related data inputs to the processor including weather information, a fuel map of the geographical area, an observed fire front, and a digital elevation model of the area, and outputs a predicted rate of fire progression;
a crew model that has physical capability parameters as inputs to the processor including a measure of a physical size of each of the members of the firefighting crew, a measure of a physical strength of each of the members of the firefighting crew, and a measure of a load carried by each of the members of the firefighting crew, and outputs a predicted rate of crew travel; and
an escape route planner that includes the fire model, the crew model, and data regarding the land cover in the geographical area, the escape route planner configured to produce one or more firefighter evacuation routes to one or more safe areas and a rating for each evacuation route based on a degree of risk.

D2. The forest fire real-time escape route planning system of paragraph D1, further comprising a transmitting device for communicating the outputs of the route planning model to a mobile device configured to display the outputs of the route planning model.

E1. A forest fire real-time escape route planning system, comprising:
a processor for receiving data;
a fire model including fire-related data;
a crew model including crew-related data, the fire model and crew model providing inputs to the processor; and
an escape route planner including a digital elevation model of a fire area, land cover data, the fire model, and the crew model, the escape route planner configured to produce one or more firefighter evacuation routes to one or more safe areas along with a safety rating for each evacuation route based on a degree of risk.

E2. The forest fire real-time escape route planning system of paragraph E1, further comprising a transmitting device for communicating the plurality of evacuation routes and safety ratings to a mobile device configured to display the plurality of evacuation routes and safety ratings.

E3. The forest fire real-time escape route planning system of paragraph E1, wherein the processor is in a mobile device.

E4. The forest fire real-time escape route planning system of paragraph E2, wherein the processor is in a computing device removed from the fire area.

F1. A forest fire real-time escape route planning system, comprising:
a processor that receives, into a database, real-time information pertaining to a geographical area, a fire located within the area, a firefighting crew located within the area, and weather in the area;
an escape route planner including the database of information, a fire model configured to predict a rate of fire progression, a crew model configured to predict a rate of travel of a firefighting crew, and an escape route finder configured to produce one or more firefighter escape routes to one or more safe areas and a safety rating for each escape route based on a degree of risk; and
a transmitting device for communicating the one or more escape routes and safety ratings to a mobile device configured to display the one or more escape routes and safety ratings.

G1. A forest fire real-time escape route planning system, comprising:
a hand held mobile device including a processor and a display,
wherein the display shows a real-time representation of a fire location relative to a geographical map, one or more potential escape routes, and a current location of the mobile device on the map.

G2. The forest fire real-time escape route planning system of paragraph G1, wherein the display shows the current location of the mobile device relative to a projected safe progression rate along a selected fire escape route.

G3. The forest fire real-time escape route planning system of paragraph G1, further comprising a fire model configured to predict the future progression of the fire.

G4. The forest fire real-time escape route planning system of paragraph G1, further comprising a crew model configured to predict a rate of travel of a firefighting crew.

G5. The forest fire real-time escape route planning system of paragraph G3 and G4, further comprising an escape route planner running on a processor, the escape route planner using information from the fire model and the crew model.

G6. The forest fire real-time escape route planning system of paragraph G5, wherein the processor is located in a mobile device held by the firefighting crew.

G7. The forest fire real-time escape route planning system of paragraph G5, wherein the processor is located in a computing device located remotely from the firefighting crew.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A forest fire real-time escape route planning system, comprising:
    a mobile device including a display, to be carried by a firefighter,
    an in-situ sensor used by the firefighter,
    a processor that receives real-time Geographical Information System data, weather, and fire front information;
    a firefighter route-planning model for predicting a rate of fire progression based on fire fuel proximate the fire and data received by the processor, and having an algorithm that defines a plurality of spaced-apart nodes associated with a geographic model of the terrain of a forest and evaluates potential evacuation routes along a combination of different nodes based on the predicted rate of forest fire progression, terrain data, and an estimate of the firefighter's rate of travel relative to the terrain, to determine a plurality of evacuation routes and corresponding degrees of risk; and
    a transmitting device for communicating the plurality of evacuation routes along with the degree of risk for each evacuation route to the mobile device which displays the plurality of evacuation routes overlaid on a map of local terrain relative to the fire front, along with the corresponding degree of risk for each evacuation route where the plurality of evacuation routes are color-coded to indicate a rating of the relative degree of risk associated with each route, and the mobile device displays a representation of a current location of a firefighter on the map,
    wherein the model further estimates a duration of time before the fire will progress to a given node based on weather-related data,
    provides a computer-implemented escape route planner system at a control location,
    predicts, by the escape route planning system, a progression of a forest fire based on fire-related data,
    determines, by the escape route planner system, one or more evacuation route(s) from an initial location of the firefighting crew to one or more safe area(s), wherein the one or more evacuation route(s) to each safe area are unlikely to cross a fire line and determining a rating for each route based on a degree of risk,
    presents a route selection map, with some or all of the one or more evacuation route(s) overlaying the route selection map, to a user on a display,
    displays a map on a mobile device carried by a firefighter, the map overlaid with the selected evacuation route received from the escape route planner system at the control location and indicating a current location of the firefighting crew,
    predicts a rate of travel of a firefighting crew based on crew-related data, wherein the one or more evacuation route(s) are determined based on the predicted rate of travel of the firefighting crew, and
    monitors a progress of the firefighting crew along the selected evacuation route, predicting a minimum safe travelling speed along the selected evacuation route, wherein displaying the map to a user, the map overlaid with the selected evacuation route, includes overlaying the map with a point moving along the selected evacuation route at the minimum travelling speed and shown in relation to a current location of the firefighting crew.

2. The system of claim 1, wherein the model continually updates the rate of fire progression relative to an actual rate of travel of the firefighter.

3. The system of claim 1, wherein the degree of risk for each evacuation route is based on a likelihood factor of whether the route crosses a fire-line.

4. The system of claim 3, wherein the model creates a 2-dimensional grid defining a plurality of spaced nodes overlaid on a geographic model of the terrain.

* * * * *